2,938,859
Patented May 31, 1960

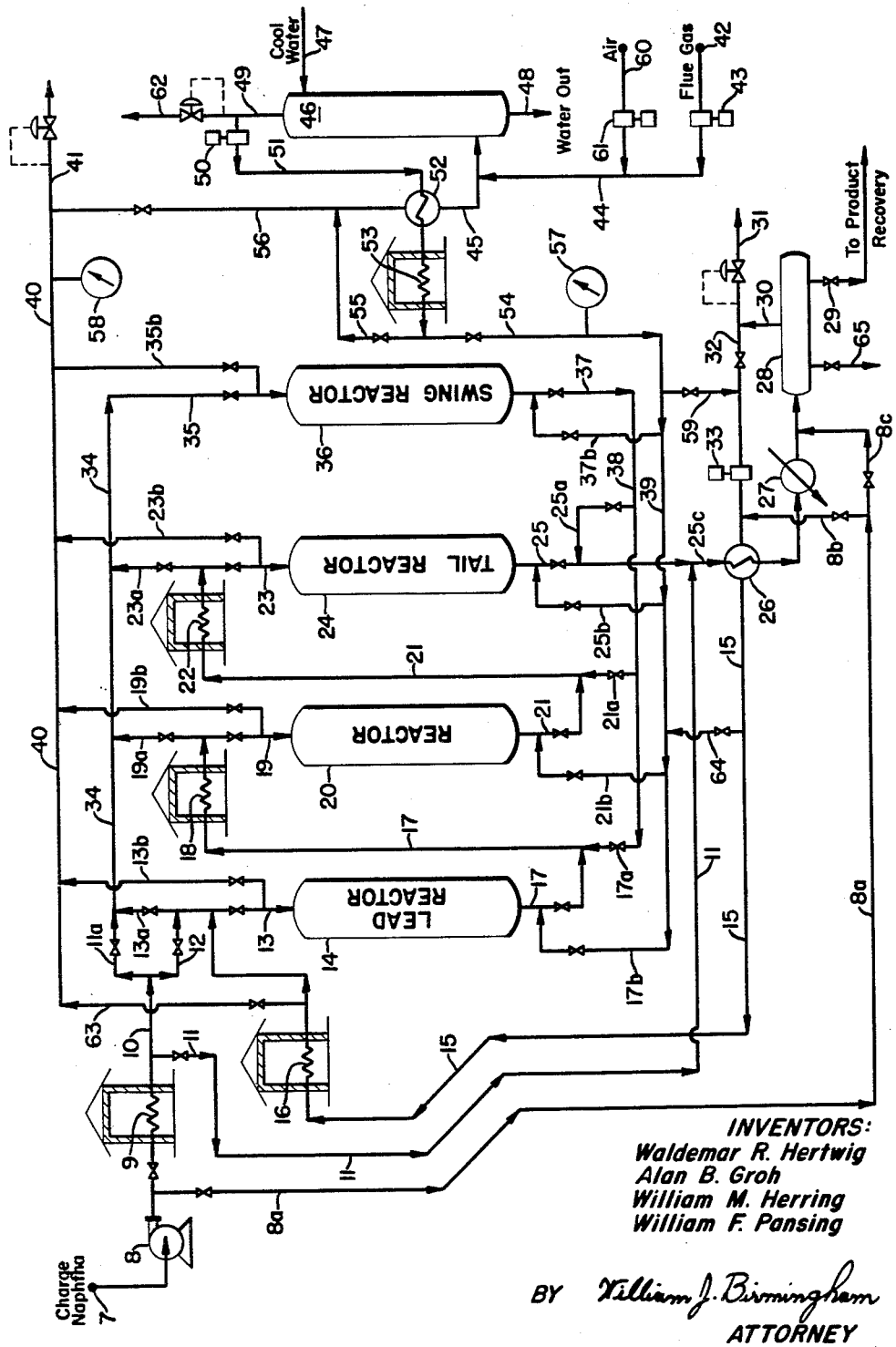
May 31, 1960
W. R. HERTWIG ET AL
2,938,859
REGENERATIVE PLATINUM CATALYST CONVERSION PROCESS
Filed April 29, 1957
INVENTORS:
Waldemar R. Hertwig
Alan B. Groh
William M. Herring
William F. Pansing
BY *William J. Birmingham*
ATTORNEY

United States Patent Office

2,938,859
REGENERATIVE PLATINUM CATALYST CONVERSION PROCESS

Waldemar R. Hertwig, Highland, Alan B. Groh, Hammond, William M. Herring, Valparaiso, and William F. Pansing, Highland, Ind., assignors to Standard Oil Company, Chicago, Ill., a corporation of Indiana Filed Apr. 29, 1957, Ser. No. 655,658

6 Claims. (Cl. 208—140)

This invention relates to regenerative platinum catalyst hydrocarbon conversion processes and, more particularly, to a hazard-free method for returning a reactor of regenerated platinum catalyst to on-stream operation without substantial deactivation thereof while hydrocarbons are simultaneously being converted in other reactors at elevated pressure.

Supported platinum catalysts, e.g., platinum-on-alumina catalyst, are used extensively in a conversion of hydrocarbons, particularly in the hydroforming of petroleum naphthas to increase the octane numbers thereof. In a typical hydroforming cycle, a mixture of petroleum naphtha and hydrogen-containing gas is passed through a bed of platinum-alumina catalyst containing between about 0.05 and 1 percent by weight of platinum, at a temperature in the range of about 850 to 1050° F., elevated pressure, i.e., a pressure between about 50 and 1000 pounds per square inch, a hydrogen rate in the range of about 1,000 to 10,000 standard cubic feet per barrel of charging stock, and an hourly weight space velocity between about 0.5 and 10. Under such conditions the catalytic properties of platinum catalyst gradually decline over a period of time as a result of carbon deposits and/or other physical and chemical changes in the platinum and/or supporting materials. This problem is particularly pronounced in processes operating at lower pressures, e.g., 300 pounds per square inch gage, as exemplified by Ultraforming (Petroleum Engineer, vol. XXVI, No. 4, April 1954, at page C–35). In such processes continuous operation is maintained by temporarily isolating reactors containing deactivated catalyst and reactivating the catalyst by contact with oxygen-containing gases while reforming is continued in the remaining reactors.

The simultaneous presence of substantial amounts of oxygen, i.e., above about 1 mol percent, and combustible gases, i.e., hydrogen and hydrocarbons, in the same system is inherently hazardous. While it is customary to use tight-fitting valves, often supplemented with seal gas, to keep these gases separated, the possibility of leakage and consequent explosion hazard is always present. To minimize this danger, pressure in vessels containing oxygen is usually maintained at reforming pressure so as to minimize pressure differential across connecting valves. Before the reactivated catalyst can be returned to on-stream operation, however, oxygen must be removed. This can not be done by depressuring and/or evacuation because of danger of valve leakage due to pressure differentials, as hereinabove described. Displacement of the oxygen at substantially the same pressure as reforming pressure is a preferred technique. Use of flue gas for displacement of oxygen is particularly desirable because of its ease of manufacture, ready availability, and low cost.

With platinum catalyst, use of flue gas for such high-pressure purging creates problems. In commercial practice oxygen-free flue gas usually contains some carbon monoxide. Carbon monoxide deactivates platinum catalyst. Furthermore, even if it were commercially feasible to produce oxygen-free and carbon monoxide-free flue gas, any subsequent contact of flue gas with hydrogen, which is normally used to reduce platinum catalyst immediately prior to on-stream operation, also reduces carbon dioxide to carbon monoxide, and/or methane and water. If substantial amounts of carbon dioxide are so converted, catalyst deactivation results.

It is therefore an object of the present invention to provide a safe method of returning a reactor of reactivated catalyst to on-stream operation while reforming continues in other reactors at elevated pressure. It is another object of the present invention to displace oxygen-containing gases without establishing substantial pressure differentials between vessels containing said oxygen-containing gases and hydrocarbons. It is still another object of the present invention to permit use of flue gas for purging oxygen from reactors without causing substantial catalyst deactivation. It is a further object of the present invention to minimize catalyst deactivation resulting from contact of carbon dioxide and hydrogen over platinum catalyst. These and other objects of our invention will become apparent as the detailed description proceeds.

To return the reactor of reactivated catalyst to on-stream operation we employ readily-available flue gas and a particular sequence of controlled steps which maximizes safety and minimizes catalyst deactivation. In accordance with our invention, we displace oxygen-containing gases from the reactor with flue gas at substantially the same pressure as reforming pressure until the oxygen content in the reactor is reduced to a level which assures complete absence of carbon monoxide, i.e., an oxygen content above about 0.1 mol percent, but not in excess of 1 mol percent. The reactor is then depressured, e.g., to atmospheric, and again purged with an oxygen-free inert gas, e.g., oxygen-free flue gas, until oxygen is eliminated. The inert gas is then purged from the reactor with hydrogen, i.e., hydrogen-rich recycle gas, and then repressured to reforming pressure, following which naphtha is introduced at reforming conditions.

To assure the presence of at least 0.1 mol percent oxygen in the reactor at the end of the first (high-pressure) flue gas purge, the oxygen content of gases is preferably measured both upstream and downstream of the reactor by any of the techniques of the prior art, including Orsat analysis and, preferably, automatic analysis using commercially-available oxygen analyzers. If reactor gases are recirculated simultaneously with flue gas addition, measurement of oxygen content downstream of the reactor only may be satisfactory. While only about 0.1 mol percent oxygen need be present (to assure complete absence of carbon monoxide), an oxygen content of between about 0.5 to 1 mol percent is preferably used to allow for inherent inaccuracies in oxygen analysis techniques and/or instruments. Oxygen contents substantially in excess of 1 mol percent, however, must be avoided because of the explosion hazard, particularly after depressuring. (As used herein, oxygen refers to free or elemental oxygen.)

The temperature of the catalyst bed, if not already at reforming temperature, is preferably adjusted to reforming temperature by circulation of heated or cooled, as the case may be, reactor gases during and/or after the high-pressure flue gas purge but before depressuring. Alternatively, catalyzed bed temperature may also be adjusted by circulating hydrogen prior to introduction of hydrocarbons. Temperature is preferably adjusted at high pressure, e.g., reforming pressure, so that the gases have adequate heat capacity and thus provide rapid temperature control.

After depressuring to at least substantially below about 50 pounds per square inch gage, preferably atmospheric, oxygen is eliminated by purging with oxygen-free inert gas which may be oxygen-free flue gas and/or nitrogen. While nitrogen might be used for the high-pressure purge also, the present invention avoids the high cost associated therewith. Far less nitrogen would, of course, be adequate for the low-pressure purge and may thus be economically feasible. After the low-pressure purge, the inert gas may, optionally, be displaced with other gases in addition to hydrogen, i.e., natural gas, normally gaseous hydrocarbons, e.g., methane, ethane, propane, and mixtures thereof. These gases may also, optionally, contain a small amount of sulfur, e.g., 0.05 to 5 mol percent, for hot-spot control. If a hydrocarbon gas is used for displacing the low-pressure flue gas and/or nitrogen, it is then preferably displaced with hydrogen-rich gas, i.e., recycle gas, prior to repressuring the system and introducing naphtha. A high hydrogen partial pressure in the system is desired so as to obtain immediate coke suppression simultaneously with introduction of naphtha.

In a specific embodiment of our invention, after catalyst reactivation at substantially reforming pressure with oxygen-containing gases, usually in the temperature range of 700 to 1300° F., flue gas is introduced up-stream of the reactor while, simultaneously, gas is bled off, usually to a stack, down-stream of the reactor at about the same rate as flue gas is being introduced. Introduction of flue gas is continued until the oxygen content of gases leaving the reactor is in the range of about 0.1 to 1 mol percent, preferably 0.5 to 1 mol percent. During and/or after introduction of the flue gas, temperature of the catalyst bed is adjusted to reforming temperature by circulating reactor gases through a heater or cooler as the case may be. After reducing oxygen content to the desired level and adjusting catalyst temperature, the reactor is depressured to atmospheric and again purged with oxygen-free flue gas until analysis of gases leaving the reactor show no oxygen is present. The reactor is then purged with hydrogen-rich recycle gas until substantially all the flue gas is displaced. For this purpose, a purging time of about 2 to 10 minutes had been found in practice to be adequate. As soon as flue gas is displaced, the reactor is pressured up with recycle hydrogen, following which hydrocarbons, i.e., naphtha vapors, are introduced.

It can be seen that reactivation of the catalyst with oxygen-containing gases at the same pressure as reforming pressure minimizes the hazard of leakage between reactors undergoing reactivation and on-stream reactors. Displacing oxygen-containing gases at reforming pressure with flue gas until the oxygen content is reduced to a level of about 0.1 to 1 mol percent accomplishes displacement with inexpensive and readily-available gas without causing catalyst deactivation by contact with significant amounts of carbon monoxide. With a low oxygen concentration in reactor gases, the reactor may be safely depressured, even, if some valve leakage occurs. Eliminating oxygen after depressuring by again purging with flue gas removes the explosion hazard entirely. Even if flue gas contains minor amounts of carbon monoxide, at atmospheric pressure no significant catalyst deactivation occurs, whereas the same concentration of carbon monoxide at higher pressure, i.e., reforming pressure, would cause substantial catalyst deactivation. Displacing the flue gas with hydrogen-rich recycle gas at atmospheric pressure also minimizes catalyst deactivation. The amount of carbon monoxide and/or methane and water formed by contact of carbon dioxide with hydrogen during low pressure purging is only slight and the catalyst contact time very short.

Our invention will be more clearly understood by references to the following example read in conjunction with the accompanying drawing which is a schematic flow diagram of an Ultraforming system in which our procedure for bringing a reactor on-stream is particularly advantageous.

In normal operation of an Ultraforming system a naphtha charge such, for example, as the 150 to 360° F. fraction of Mid-Continent virgin naphtha, which may or may not be hydrodesulfurized, is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with hydrogen-rich recycle gas from line 15 which is preheated in heater 16. Effluent from reactor 14 passes through line 17, reheater 18 and transfer line 19 to reactor 20. Effluent from reactor 20 passes through line 21, reheater 22 and transfer line 23 to tail reactor 24. It should be understood that more than three reheater-reactor stages may be employed in the system.

Effluent from the tail reactor flows through lines 25 and 25c, heater exchanger 26 and cooler 27 to separator 28 from which hydroformed product is withdrawn through line 29 to a stabilizer and/or conventional product recovery system. A part of the hydrogen-rich gas withdrawn from the separator through line 30 may be vented through line 31, but usually about 1,000 to 10,000 cubic feet per barrel of charge is recycled through line 32 by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a, and 25b remain closed and the valves in line 12, 13, 17, 19, 21, 23 and 25 remain open. Such leak-susceptible closure means (valves) are usually provided with sealing gases, e.g., flue gas, to minimize the explosion hazard.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and rejuvenation and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina; it may be prepared by compositing a platinum chloride with an alumina support as described, for example, in U.S. Patent 2,659,701, and it preferably contains about .1 to .6 weight percent of platinum.

The on-stream pressure is usually below about 400 pounds per square inch gage, i.e., in the range of 200 to 350 pounds per square inch gage. The inlet temperatures to each reactor are usually in the range of about 850 to 1000° F., e.g., about 920° F., and may be approximately the same for each reactor although it is sometimes desirable to employ somewhat lower inlet temperature to the initial reactor than to the remaining reactors. The overall weight space velocity may be in the range of about 0.5 to 5 pounds of naphtha per pound of catalyst per hour. There is, of course, a pressure drop in the system so that the lead reactor may operate at about 20 to 100 pounds per square inch higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, hydrogen-rich gas may be introduced from line 15 to manifold line 39 by line 64.

For effecting purging and regeneration of the catalyst in any bed, purge gases and regeneration gases may be introduced through manifold line 39 and a selected one of lines 17b, 21b, 25b and 37b. Such purge and regeneration gases may be selectively withdrawn through lines 13b, 19b, 23b and 35b to manifold line 40 from which gases may be vented or flared through line 41. Flue gas from source 42 may be introduced to the system by compressor 43 and passed by lines 44 and 45 through chamber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, heater 53 and line 54 to manifold line 39 when it is desired to introduce flue gas into the system for purging and/or regeneration. By closing the valve in line 54 and opening the valve in line 55, the flue gas may be recirculated through line 56, heat exchanger 52 and line 45 back to the scrubber. Air may be introduced from source 60 by compressor 61 for effecting regeneration and/or regeneration-rejuvenation of the catalyst. Rejuvenation is an additional oxidative treatment after the regenerative coke burn. During regeneration excess flue gas may be vented from the system by line 62.

One unique characteristic of the Ultraforming process, in contrast with non-regenerative platinum reforming processes, is the fact that an Ultraformer can be started up without use of extraneous hydrogen. Such a startup procedure is described in co-pending application S.N. 502,604, filed April 20, 1955, issued as U.S. 2,910,430.

The method of effecting catalyst regeneration will be described as applied to the swing reactor but it will be understood that the same procedure may be employed for any one of the other reactors when it is blocked out. When the charge inlet valve in line 35 is closed and while the valve in line 37 remains open, hot hydrogen-rich gas is introduced by line 63 to manifold line 40 and thence through line 35b to strip out any hydrocarbons that may remain in the reactor, this stripped material being discharged through lines 37, 38, 25a, and 25c. Next, the valve in lines 63 and 37 are closed and reactor 36 is depressured by opening the valve in line 41. Next, the reactor is purged to eliminate hydrogen-rich gas therefrom either by introducing flue gas (which is normally the products from combustion of hydrocarbons in air) from line 54 via lines 39 and 37b, the purge gases being vented through line 35b, 40 and 41. After the flue gas purge, the valve in line 41 is closed and introduction of flue gas from source 42 is continued to pressure the reactor with flue gas to approximately the same pressure as that employed in on-stream processing, i.e., about 300 pounds per square inch gage. The temperature of the catalyst bed is adjusted to about 650 to 750° F. preparatory to initiating regeneration by circulating flue gas, under such pressure, through the reactor by compressor 50. Heat may be supplied to the circulating gas by heater 53, if necessary. Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 pounds per square inch gage. The cooled flue gas which is recirculated by compressor 50 may be further dried by passing through a desiccant bed (not shown) before it is returned through heat exchanger 52 to heater 53 which, during regeneration, maintains a transfer line temperature of approximately 700° F.

After the carbon deposits are removed, the transfer line temperature of heater 53 is increased to about 950° F. in order to reheat the catalyst bed to that temperature. If rejuvenation is required the introduction of flue gas is stopped and the introduction of air is continued so that the catalyst is treated with a circulating air stream at a pressure of about 100 to 350 pounds per square inch gage and a temperature of about 950° F. to 1100° F. for a period of about one-half hour to twelve hours or more depending upon the extent of rejuvenation required.

After the regeneration (or after rejuvenation if rejuvenation has been effected) the introduction of air is stopped, and, in accordance with our invention, flue gas is introduced from source 42 to purge oxygen from the swing reactor and from the regeneration system via line 41 until oxygen contents of gases entering and leaving the swing reactor are in the range of about 0.1 to 1 mol percent as read on oxygen analyzers 57 in line 54 and 58 in line 40 respectively. When the oxygen concentration has been reduced to the desired level, introduction of flue gas from source 42 is stopped. If the catalyst bed is not already at desired reforming temperature, circulation of the gases may be continued to raise or lower temperature as the case may be. The system is then depressured by opening the valve in line 41. The valve in line 56 is then closed, and oxygen-free flue gas from source 42 is again introduced to purge the swing reactor once-thru so as to remove all remaining oxygen via line 41. When oxygen analyzer 58 shows no further indication of oxygen, valve in lines 54 is closed, and the introduction of flue gas is stopped.

Flue gas is then purged from the system with hydrogen-rich recycle gas from line 15 which is introduced through lines 64, 39, and 37b by opening the valve in line 64. Next, the valves in lines 37b, 64 and 41 are closed, and reactor 36 is pressured with hot hydrogen-rich recycle gas introduced through lines 63, 40, 35b by opening the valve in line 63. When the reactor is thus brought to desired operating pressure, the valves in lines 63 and 35b are closed and the reactor may be placed on-stream by opening valves in lines 35 and 37.

It should be noted that flue gas from source 42 normally contains a small amount of carbon monoxide, preferably not exceeding about 1 mol percent. This assures that the flue gas, which may also be used for sealing valves, is free of oxygen. Furthermore, the carbon monoxide can react with any trace amounts of oxygen that are left in the system.

While our invention has been described herein as applied to bringing the swing reactor of an Ultraforming unit on-stream while other reactors in the system are already on-stream, it should be understood that it is equally applicable to each of the other reactors when bringing said reactors on-stream. It should also be understood that it is applicable to other types of regenerative platinum catalyst hydrocarbons systems in which platinum catalyst in one part of the system is contacted with oxygen-containing gases while hydrocarbons are being converted in another part of the system. Utilization of our invention in any such system, wherein the problems above described are confronted, provides an inexpensive, convenient, and safe method of returning a reactor to on-stream operation without risking substantial deactivation of the catalyst. Various alternative arrangements and operating conditions will be apparent from the above description to those skilled in the art.

*Example*

To illustrate how our method preserves catalyst activity, two pilot-plant runs were made using the same feed stock, the same catalyst, and the same operating conditions. Before each run the catalyst had been freshly regenerated and rejuvenated. In one run, identified below as run No. 1, the high-pressure flue gas purge after regeneration and rejuvenation was carried out in the manner of the prior art, i.e., complete elimination of oxygen. In the other run, identified below as run No. 2, which illustrates our invention, the high-pressure flue gas purge was terminated when the oxygen content of exit gases was reduced to 0.2 mol percent. In the latter case both the activity and activity decline rate were superior to that of run No. 1, as will be described in detail hereinafter.

The catalyst employed in these pilot-plant runs was a co-gelled platinum-alumina catalyst containing about 0.6 weight percent platinum and about 0.6 weight percent chloride. The catalyst was tested in a multi-bed, pilot plant reactor system having a forced temperature gradient which simulated that of a commercial platinum catalyst hydroforming system having four reactors with reheat between each reactor. Immediately preceding each of the tests, the catalyst, which had been used for hydroforming a petroleum naphtha under conventional conditions, was regenerated at a bed temperature of 700° F., a flame front temperature of 950° F., and a pressure of 300 pounds per square inch gage. After regeneration the catalyst was rejuvenated with air at 1000° F. and a pressure of 300 pounds per square inch gage for a period of four hours.

Prior to run No. 1, oxygen was removed from the reactor system by purging with flue gas containing about 1 mol percent carbon monoxide at 300 pounds per square inch gage until the exit gases showed no oxygen and 0.9 mol percent carbon monoxide. Prior to run No. 2, which illustrates our invention, the high-pressure purge with flue gas was terminated when the oxygen content of the exit gases contained about 0.2 mol percent oxygen. After depressuring in each case, the catalyst was again purged with flue gas at atmospheric pressure, thus eliminating oxygen, if any. The flue gas was then purged from the reaction system with hydrogen containing about 0.01 percent hydrogen sulfide, following which pressure was raised to 300 pounds per square inch gage.

In each case the catalyst was tested using a hydrofined Mid-Continent naphtha having the following inspections.

ASTM distillation:

| | |
|---|---|
| IBP | 185 |
| 5% | 220 |
| 10% | 229 |
| 30% | 258 |
| 50% | 280 |
| 70% | 301 |
| 90% | 331 |
| 95% | 347 |
| Max. | 374 |
| Gravity, °API | 55.5 |
| RVP, lbs. | 1.2 |
| Octane number, CFR–R, clear | 44.5 |
| Sulfur, wt. percent: | |
| In naphtha | 0.0013 |
| Added | 0.0070 |
| Type analysis, vol. percent: | |
| Paraffins | 47.0 |
| Olefins | 1.0 |
| Naphthenes | 43.5 |
| Aromatics | 8.5 |

Operating conditions were an average temperature of 916° F. for the first 65 hours, following which temperature was raised to an average of 927° F., a pressure of 300 pounds per square inch gage, a weight hourly space velocity of 2.0, and a hydrogen-rich recycle gas rate of 4000 standard cubic feet per barrel of naphtha charge. Reformate product was collected and from the operating conditions and the octane number of the reformate, which, in each case, approximated 95 research clear, the catalyst activity was determined. Catalyst activity is calculated as the relative quantity, expressed as a percentage, of a standard reference catalyst required to produce a $C_5+$ product fraction having the same octane number under the same test conditions. The results were as follows:

| | Run No. 1 | Run No. 2 (Present Invention) |
|---|---|---|
| O₂ in exit gas at end of hi-press. flue gas purge | 0 | 0.2 |
| CO in exit gas at end of hi-press. flue gas purge | 0.9 | 0 |
| Catalyst Activity, Hours on oil: | | |
| 4 | 65 | 82 |
| 12 | 81 | 91 |
| 20 | 78 | 76 |
| 36 | 68 | 72 |
| 60 | 63 | 69 |
| 84 | 60 | 76 |
| 92 | 55 | 78 |

From the above data it is readily apparent that by returning catalyst to on-stream operation by the method of the present invention, activity of the reactivated catalyst is substantially preserved. Likewise, activity decline rate is only half that of the method of the prior art.

Having thus described our invention, we claim:

1. In a multi-reactor hydrocarbon conversion process wherein supported-platinum catalyst in at least one off-stream reactor is reactivated by contact with a gas containing above about 1 mole percent oxygen at an elevated pressure between about 50 and 1000 pounds per square inch while supported-platinum catalyst in at least one on-stream reactor is simultaneously contacted with hydrocarbons under conversion conditions including about said elevated pressure, the method of returning an off-stream reactor to on-stream operation after reactivation thereof and prior to depressuring said off-stream reactor below said elevated pressure which comprises purging said off-stream reactor at about said elevated pressure with flue gas containing less than at least about 1.0 mole percent oxygen until the oxygen content of gases in said off-stream reactor is reduced to a level of about 0.1 to 1.0 mole percent, depressuring said off-stream reactor substantially below about 50 pounds per square inch, again purging said off-stream reactor with an oxygen-free inert gas selected from the group consisting of nitrogen, oxygen-free flue gas, and mixtures thereof until oxygen is eliminated therefrom, purging said off-stream reactor with a gas substantially free of carbon oxides and oxygen, said gas substantially free of carbon oxides and oxygen being selected from the group consisting of hydrogen, normally-gaseous hydrocarbons, and mixtures thereof, repressuring said off-stream reactor to about said elevated pressure, and introducing hydrocarbons therein.

2. The method of claim 1 wherein said oxygen-free inert gas is oxygen-free flue gas.

3. The method of claim 1 wherein said gas substantially free of carbon oxides and oxygen is hydrogen-rich recycle gas.

4. The method of claim 1 including the step prior to depressuring of circulating gases through said off-stream reactor so as to adjust the temperature of the supported platinum catalyst within the range of about 850 to 1050° F.

5. In a multi-reactor naphtha hydroforming process wherein supported platinum catalyst in at least one off-stream reactor is contacted at an elevated pressure between about 50 and 1000 pounds per square inch with a gas containing oxygen at a concentration above about 1 mole percent while supported-platinum catalyst in at least one on-stream reactor is simultaneously contacted with naphtha vapors in the presence of hydrogen-rich recycle gas under hydroforming conditions including about said elevated pressure, the method of returning an off-stream reactor to on-stream operation after oxygen-contacting of the catalyst and prior to depressuring said off-stream reactor below said elevated pressure which comprises purging said off-stream reactor at about said elevated pressure with flue gas containing less than at least about 1.0 mole percent oxygen until the oxygen content of gases in said off-stream reactor is reduced to a level in the range of about 0.1 to 1 mole percent, depressuring to substantially below about 50 pounds per square inch, again purging said off-stream reactor with oxygen-free flue gas until oxygen is removed therefrom, introducing hydrogen-rich recycle gas, repressuring to about said elevated pressure, and introducing naphtha therein.

6. In the method of returning an off-stream reactor, containing supported-platinum catalyst and above about 1 mole percent oxygen at elevated pressure, to on-stream operation while hydrocarbons are simultaneously being converted in the presence of supported-platinum catalyst and hydrogen-rich gas at an elevated pressure between about 50 and 1000 pounds per square inch in at least another reactor connected to said off-stream reactor by leak-susceptible closure means, which method comprises purging oxygen from said off-stream reactor with oxygen-free flue gas at about said elevated pressure and thereafter introducing said hydrogen-rich gas and hydrocarbons, the improved procedure which comprises purging said off-stream reactor with oxygen-free flue gas at elevated pressure only until the oxygen concentration is reduced to a level of about 0.1 to 1 mole percent, depressuring to substantially below about 50 pounds per square inch, again purging said reactor with oxygen-free flue gas at substantially below about 50 pounds per square inch until oxygen is eliminated therefrom, introducing hydrogen-rich recycle gas, repressuring to about said elevated pressure, and introducing hydrocarbons therein.

References Cited in the file of this patent

UNITED STATES PATENTS

| | | |
|---|---|---|
| 2,388,536 | Gunness | Nov. 6, 1945 |
| 2,662,861 | Riblett et al. | Dec. 15, 1953 |
| 2,773,013 | Wolf et al. | Dec. 4, 1956 |
| 2,773,014 | Snuggs et al. | Dec. 4, 1956 |
| 2,880,162 | Moore | Mar. 31, 1959 |